(12) United States Patent
Hamilton

(10) Patent No.: US 7,221,285 B1
(45) Date of Patent: May 22, 2007

(54) SYSTEM AND METHOD FOR PROVIDING AN IMPROVED STANDBY MODE FOR INFRARED DATA TRANSCEIVERS

(75) Inventor: T. Allan Hamilton, San Jose, CA (US)

(73) Assignee: ZiLOG, Inc., San Jose, CA (US)

( * ) Notice: Subject to any disclaimer, the term of this patent is extended or adjusted under 35 U.S.C. 154(b) by 0 days.

(21) Appl. No.: 09/135,154

(22) Filed: Aug. 17, 1998

(51) Int. Cl.
 *H04Q 1/00* (2006.01)
(52) U.S. Cl. ............ 340/825.72; 398/202; 398/105; 455/343.1
(58) Field of Classification Search ........... 340/825.72, 340/10.33, 10.34; 455/343; 359/142; 398/35
See application file for complete search history.

(56) References Cited

U.S. PATENT DOCUMENTS

| | | | |
|---|---|---|---|
| 5,115,236 A * | 5/1992 | Kohler | 340/825.69 |
| 5,239,295 A | 8/1993 | DeLuca et al. | 340/825.44 |
| 5,606,443 A | 2/1997 | Sgambati | 359/143 |
| 5,706,110 A * | 1/1998 | Nykanen | 398/35 |
| 5,973,611 A * | 10/1999 | Kulha et al. | 340/5.62 |
| 6,157,476 A | 12/2000 | Angerstein et al. | 359/152 |
| 6,169,295 B1 | 1/2001 | Koo | 257/81 |
| 6,301,035 B1 | 10/2001 | Schairer | 359/152 |
| 6,570,188 B1 | 5/2003 | Nitsche et al. | 257/81 |
| 6,810,216 B1 | 10/2004 | Tourunen | 398/202 |

FOREIGN PATENT DOCUMENTS

EP 0317007 5/1989
EP 0772307 5/1997

OTHER PUBLICATIONS

Infrared Data Association Serial Link Access Protocal (IrLAP) Specification, Infrared Data Association, http://www.irda.org/standards/specifications.asp, pp. 94-95 (1996).*
Infrared Data Association Serial Infrared Link Access Protocol (IRLAP), Infrared Data Association, HTTP://WWW.IRDA.ORG/STANDARDS/SPECIFICATIONS.ASP, pp. 5-7, 15, 27-30, 34, 47-54.

(Continued)

*Primary Examiner*—Brian Zimmerman
(74) *Attorney, Agent, or Firm*—Imperium Patent Works; T. Lester Wallace

(57) ABSTRACT

A System and Method for Providing an Improved Standby Mode for Infrared Data Transceivers is disclosed. Standby Mode for Infrared Data Transceivers. The device and system of the present invention includes a discovery signal receiver and power actuator module that consumes a fraction of the power of a conventional Ir transceiver system. The preferred device and system may be integral to a conventional Ir transceiver, or it may be a stand-alone system or device. Furthermore, the device and system are configured to activate full power to the Ir transceiver system upon recognition of an Ir discovery signal, and this power-up signal might also be user-initiated in some preferred embodiments. The preferred switch means for providing full power to the Ir transceiver system is in an open position while the Ir-enabled appliance is in a standby or sleep mode. The preferred device and system recognize a 9600 baud Ir discovery signal.

14 Claims, 6 Drawing Sheets

OTHER PUBLICATIONS

"Infrared Transceiver Module TFDU6101" data sheet, Vishay Semiconductors, document No. 81288, 15 pages (Sep. 26, 2006).
"Infrared Transceiver Module TFDU4101" data sheet, Vishay Semiconductors, document No. 82525, 16 pages (Nov. 2, 2000).
MiniSIR2 IrDA 1.0 Transceiver Module data sheet, Novalog, Inc., 18 pages (Oct. 2000).

HSDL-1001 Infrared IrDA Compliant Transceiver data sheet, Agilent Technologies, 8 pages (Nov. 1999).

ZHX1403 SIR UltraSlim Transceiver data sheet, Zilog Inc., 15 pages (2005).

* cited by examiner

SYSTEM AND METHOD FOR PROVIDING AN IMPROVED STANDBY MODE FOR INFRARED DATA TRANSCEIVERS

BACKGROUND OF THE INVENTION

1. Field of the Invention

This invention relates generally to infrared communications systems and, more specifically, to a System and Method for Providing an Improved Standby Mode for Infrared Data Transceivers.

2. Description of Related Art

As technology becomes continually more accessible to the "common man," the ability to use, store, transfer and otherwise manipulate information has become the focus of most businesses as well as for the individual consumer. Access to the information resources is commonly by some sort of network system, including World Wide Web, "Intranets", local area networks, wide area networks, as well as corporate databases.

While the conventional method for connecting to one of these information networks has been via cable and wire, as the reliance upon connectivity to information has deepened, the desire to gain such access from mobile or portable devices has strengthened. These portable devices, such as Personal Digital Assistants, hand-held computers, cellular telephones, and even digital cameras are now being connected to each other and to networks via Infrared Data Communications. In fact, it is virtually impossible to purchase a notebook computer today that does not include an Infrared Data Communications assembly resident within it.

One drawback of these portable devices or appliances is their inherent dependency upon portable power sources (i.e. batteries of some sort). As functionality is added to the device, so is demand upon the portable power source, therefore any way of reducing the demand upon the portable power source is extremely desirable. One particular system that can place a significant demand upon the portable power source is the Ir transceiver system—FIG. 1 provides pertinent details about how these systems function. FIG. 1 is an illustration of a pair of prior Ir-enabled appliances 10 and 12 in standby mode. Standby mode is that condition to which the appliance returns when the appliance is not actively engaged in Ir communications. Each appliance, comprises (in pertinent part) an Ir transceiver system 14 and 16 that is powered by power supply means 18 and 20 for powering the electronics and mechanical devices contained within the appliances 10 and 12. While the power supply means 18 and 20 may be external electrical power, the means 18 and 20 that is pertinent to this discussion is a portable battery-type power supply means because its available charge is limited. The limited life span of the battery-type power supply means 18 and 20 is the focus of the present invention.

In the prior appliances 10 and 12, the Ir transceiver systems 14 and 16 operate in a constant, full-power demand condition, as demonstrated by the IrXS (Infrared transmission system) Power State indicators 22 and 24 (these are simply representations to indicate a power load condition—they are not intended to represent actual devices). The problem with the prior appliances 10 and 12 resides with the "standby" or "sleep" mode of the If transceiver systems 14 and 16. When in standby mode, as represented by balloons 26 and 28, there are no emissions from the systems 14 and 16; the systems 14 and 16 are simply monitoring their environment for a "discovery" signal. Discovery signals are Ir signals in a particular frequency band, currently established by the IRDA (Infrared Data Association) at 9600 baud, that one appliance 10 or 12 sends to another appliance to "wake up" the other appliance in preparation for the commencement of Ir communications. As illustrated by FIG. 1, the prior appliances 10 and 12 are in full-power demand conditions 22 and 24, even though they are sleeping. Even though the transceiver systems 14 and 16 are performing no work beyond simply listening, they are imposing the same drain on the power supply means 18 and 20 that a fully active transceiver 14 and 16 would draw. As discussed earlier, any reduction in power demand will provide significant benefits to the user of these portable Ir-enabled appliances. What is needed, therefore, is a means for reducing the power drain on the power supply means 18, for example, when portable Ir-enabled appliances are in standby mode.

SUMMARY OF THE INVENTION

In light of the aforementioned problems associated with the prior systems and devices, it is an object of the present invention to provide a System and Method for Providing an Improved Standby Mode for Infrared Data Transceivers. It is a further object that the device and system include discovery signal receiver and power actuator module that consumes a fraction of the power of a conventional Ir transceiver system. The preferred device and system may be integral to a conventional Ir transceiver, or it may be a stand-alone system or device. It is a further object that the device and system activate full power to the Ir transceiver system upon recognition of an If discovery signal. It is another object that the power-up signal also be user-initiated. It is a still further object that the switch means for providing full power to the Ir transceiver system be in an open position while the Ir-enabled appliance is in a standby or sleep mode. It is a still further object that the device and system recognize a 9600 baud Ir discovery signal.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a System and Method for Providing an Improved Standby Mode for Infrared Data Transceivers.

Figure 2A:
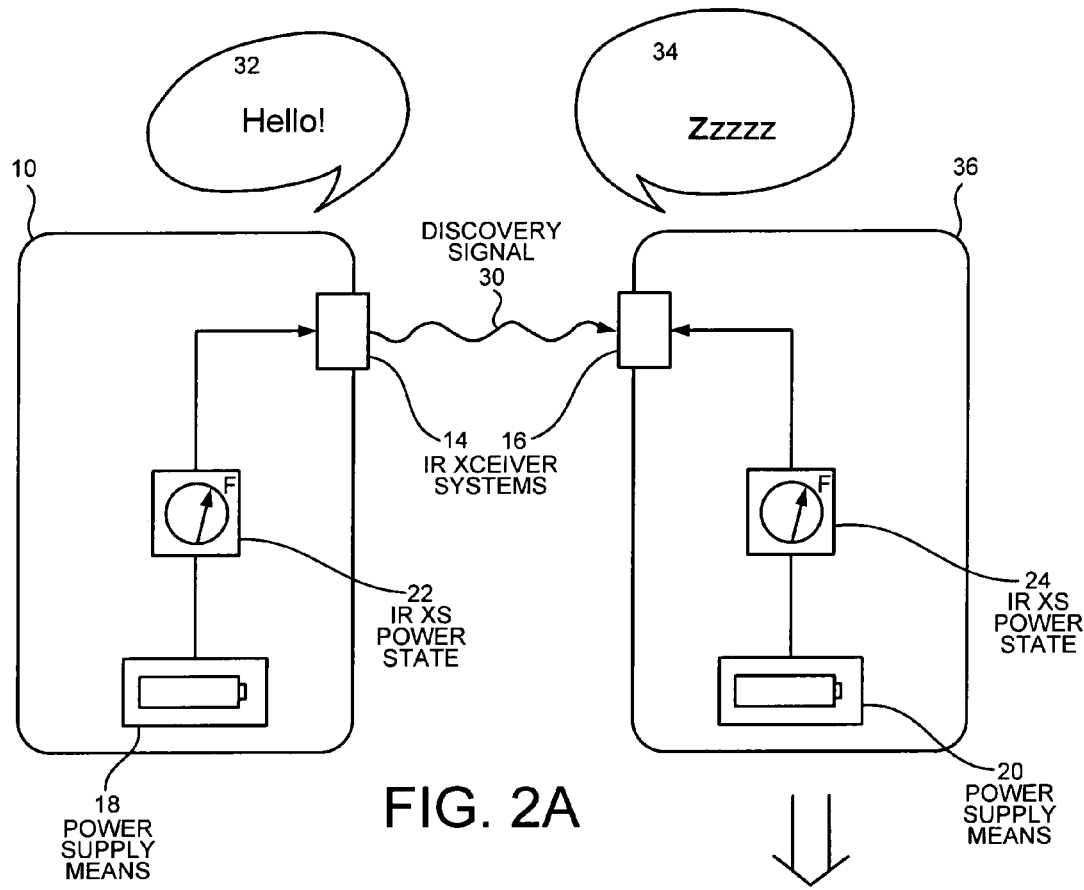
FIGS. 2A and 2B are illustrations of the operation of the improved standby mode of the present invention.
Figure 2B:
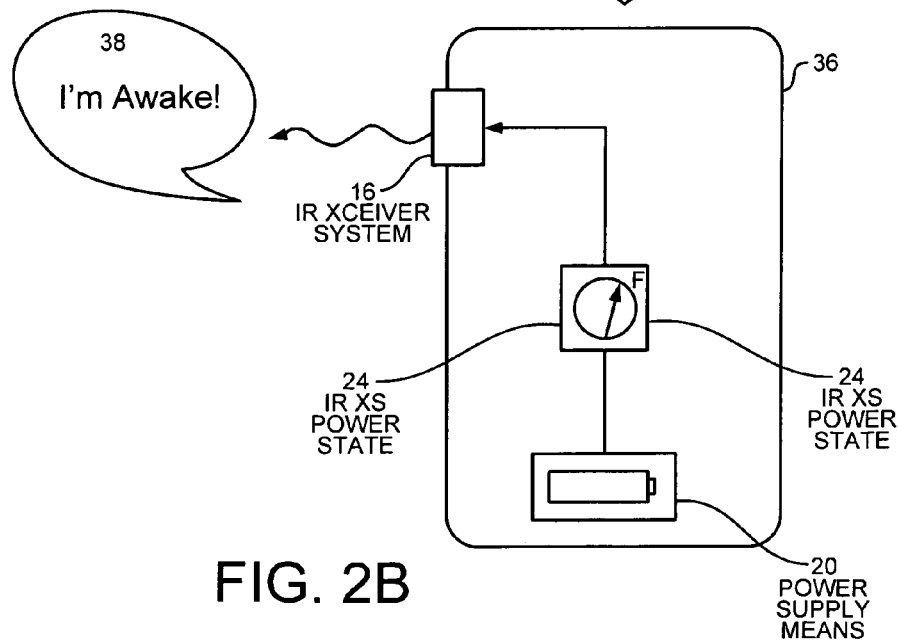

The present invention can best be understood by initial consideration of FIGS. 2A and 2B. FIGS. 2A and B are illustrations of the operation of the improved standby mode system and method of the present invention. In FIG. 2A, the appliance 10 has just sent a discovery signal 30 (represented by balloon 32) to the "sleeping" 34 Ir-enabled appliance 36 incorporating the system of the present invention. Until the discovery signal 30 is received and recognized as such by the Ir transceiver system 16, the IrXS (Ir transceiver system) power state 24 remains in a low-power demand condition, a condition which places a very minor draw on the power supply means 20.

FIG. 2B reflects the transition that occurs within the appliance 36 once the discovery signal 30 has been received and recognized by the Ir transceiver system 16. As can be seen, once "discovered," the IrXS power state 24 switches to a full-power condition, thereby enabling the Ir transceiver system 16 to reply 38 to the other appliance 10 via Ir signal. Until discovered, therefore, the IrXS power state 24 is in a low power condition simply "listening" for a discovery signal; after discovery, the IrXS power state 24 shifts to full power condition so that the transceiver system 16 can generate an Ir transmission.

Figure 3:
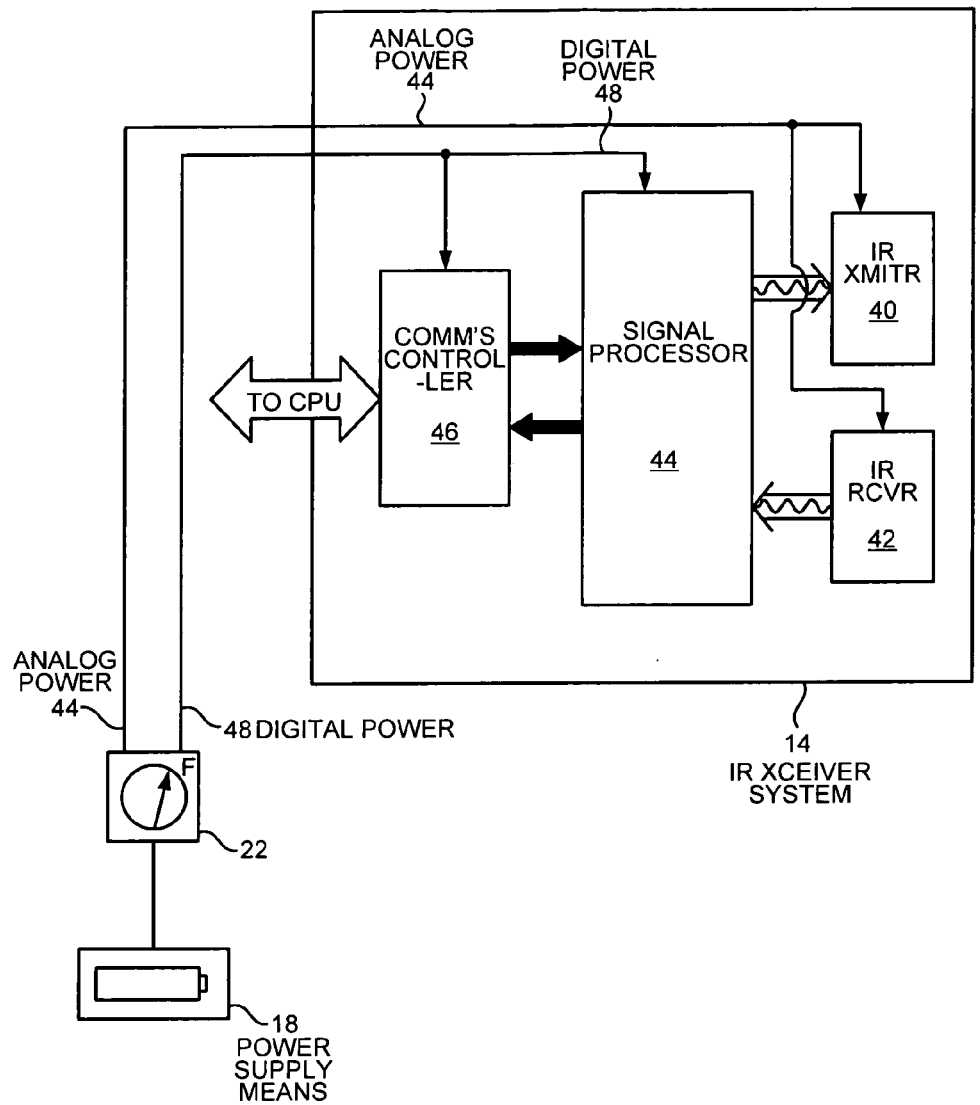
FIG. 3 is an illustration of the power supply schematic of a typical prior Ir transceiver system.

Now turning to FIG. 3, we can delve deeper into the prior state of the art in order to contrast it with the present invention. FIG. 3 is an illustration of the power supply schematic of a typical prior Ir transceiver system 14. In pertinent part, the transceiver system 14 comprises an Ir transmitter 40 for transmitting Ir signals and an Ir receiver 42 for receiving incident Ir signals. Both the transmitter 40 and receiver 42 are powered by "analog power" 44; analog power 44 is simply a power takeoff from the appliance's hardware that is segregated for use in analog devices (such as the Ir photodiodes)—the power is identical to that coming from the power supply means 18.

Figure 1:
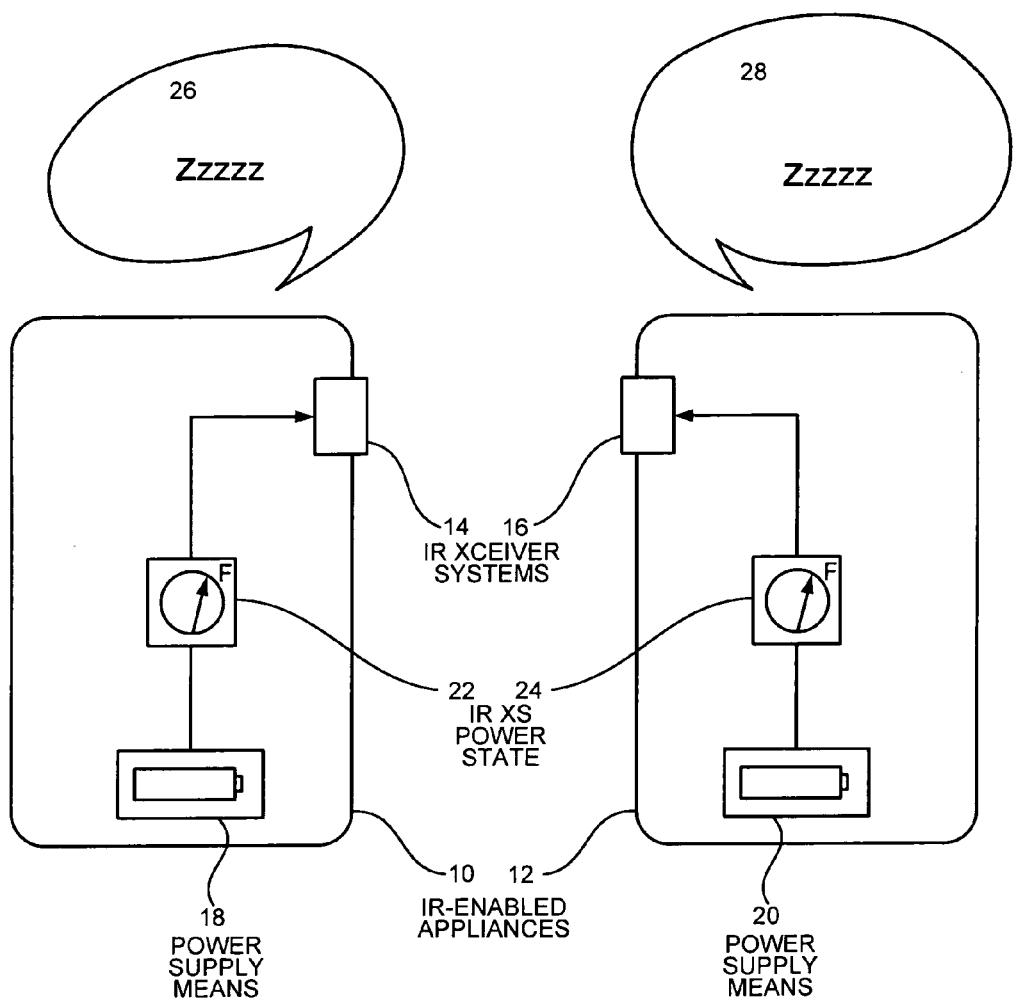
FIG. 1 is an illustration of a pair of prior Ir-enabled appliances in standby mode.

The Ir transmitter 40 and receiver 42 are controlled by and/or communicate with a signal processor 44 that encodes and decodes data passing between the transmitter 40/receiver 42 and a communications controller 46. The communications controller 46 then communicates with the central processing unit (CPU) or other systems elsewhere within the appliance. The signal processor 44 and communications controller 46 receive their power from "digital power" 48; digital power 48 is, again, simply a power takeoff from the appliance that is confined to use in digital devices. As shown also, the IrXS 22 is in a full-power condition, as previously described in connection with FIGS. 1 and 2.

Figure 4:
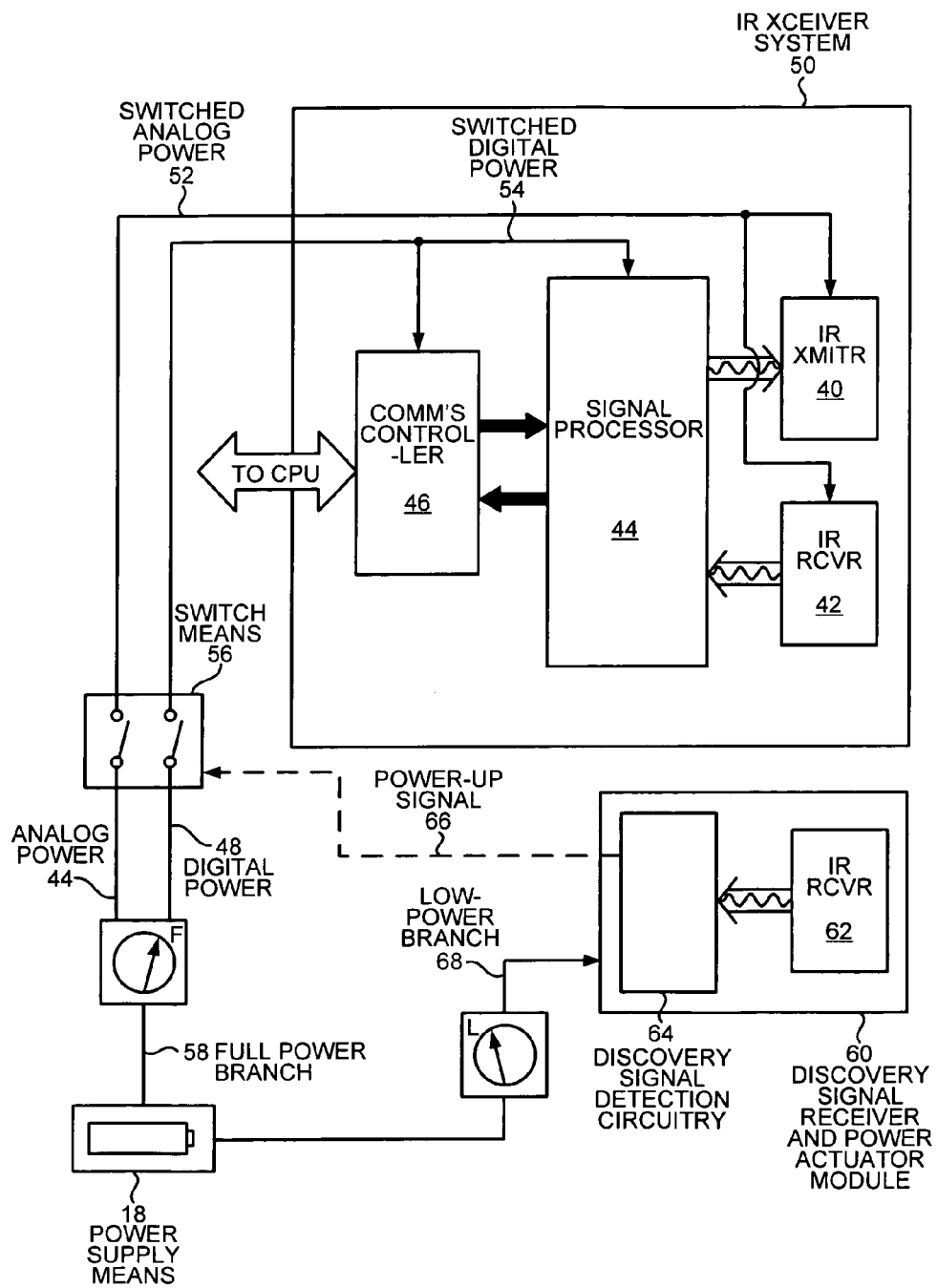
FIG. 4 is an illustration of a preferred low power discovery signal receiver and power actuator module of the present invention.

Consideration of FIG. 4 will provide additional detail regarding the innovation of the present invention; it is an illustration of a preferred low power discovery signal receiver and power actuator module 60 of the present invention. The improved Ir transceiver system 50 includes an Ir transmitter 40, Ir receiver 42, Signal Processor 44 and Communications Controller 46, similar to the prior transceiver system. In this novel system, however, the analog and digital components are powered by switched analog and switched digital power 52 and 54, respectively. The switched analog power 52 and switched digital power 54 are activated by switch means 56 to energize the analog 44 and digital power 48 to their respective components. The switch means 56 for energizing and de-energizing the analog 52 and digital 54 switched powers may be of a variety of conventional hardware and/or software combinations to provide, essentially, "on" and "off" control of the electrical power supply. Because the switched analog 52 and digital power 54 are configured to provide full power to the components of the transceiver system 50, they are powered by the full power branch 58. While the transceiver system 50 is in the sleep or standby mode, the switch means 56 is in an open condition and the switched analog 52 and digital power 54 are deactivated—full power to the transceiver system 50 is therefore switched off.

The innovation of the present invention lies in the discovery signal receiver and power actuator module 60. This module 60 comprises, in pertinent part, a simple Infrared receiver 62 and related discovery signal detection circuitry 64. The receiver 62 and circuitry 64 are configured to recognize incident Ir discovery signals (i.e. distinguishing them from other noise), and thereafter transmit a power-up signal 66 to the switch means 56. Once the power-up signal 66 is received by the switch means 56, the switched analog 52 and digital power 54 are activated to the transceiver system 50, and the transceiver system 50 is enabled for full Ir signal transmission and receipt.

The discovery signal receiver and power actuator module 60 is powered by a low-power branch 68; it should be understood that the low power 68 and high power branches 58 are simply illustrations to assist in the understanding that the discovery signal receiver and power actuator module 60 draws only a small amount of power compared to the demand by the Ir transceiver system 50. Furthermore, it should be appreciated that the power-up signal 66 may be manually overridden to either the "on" or "off" condition, in order to provide the user with additional flexibility in power demand control and system functionality.

Figure 5:
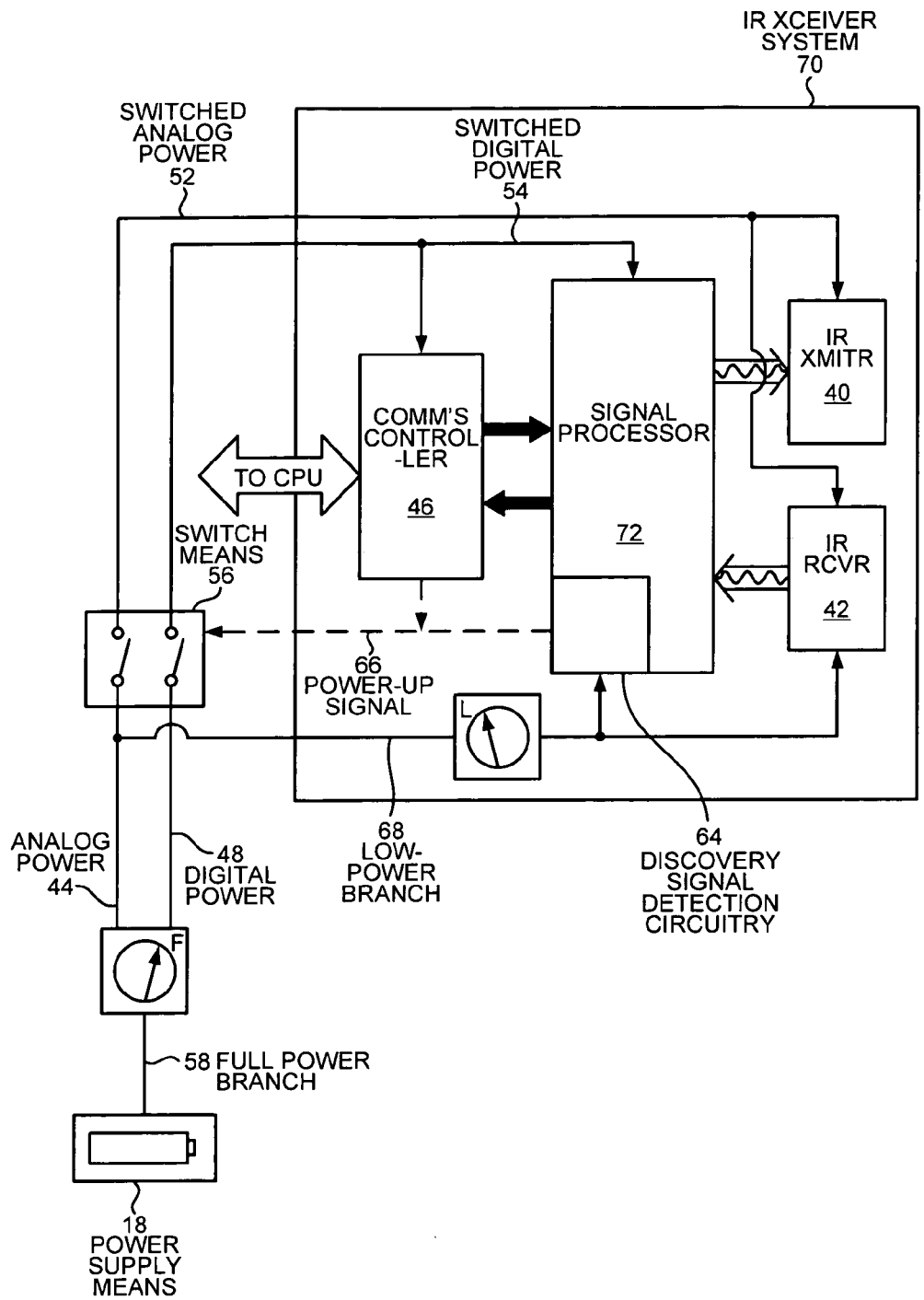
FIG. 5 is an illustration of a preferred integrated low power discovery signal receiver and power actuator system of the present invention.

If we now turn to FIG. 5, we can review yet another preferred embodiment of the present invention. FIG. 5 is an illustration of a preferred integrated low power discovery signal receiver and power actuator system of the present invention. In this embodiment, the Ir transceiver system 70 comprises an alternate signal processor 72, which includes integrated discovery signal detection circuitry 64 connected to the low-power branch 68. As such, the conventional Ir receiver 42 is able to operate (controlled by the discovery signal detection circuitry 64) in a low-power standby state. When the circuitry 64 recognizes a discovery signal received by the Ir receiver 42, it, in cooperation with the communications controller 46, generates the power-up signal 66 for activating the switch means 56 to energize the switched analog 52 and digital power 54. In contrast, the advantage of this embodiment is that only a single Ir receiver 42 is required; a simple operational modification to the existing transceiver system components is all that is necessary. The advantage of the system described in connection with FIG. 4 is that it enables a conventional Ir-enabled appliance to be retrofitted to operate in a low-power standby mode.

Figure 6:
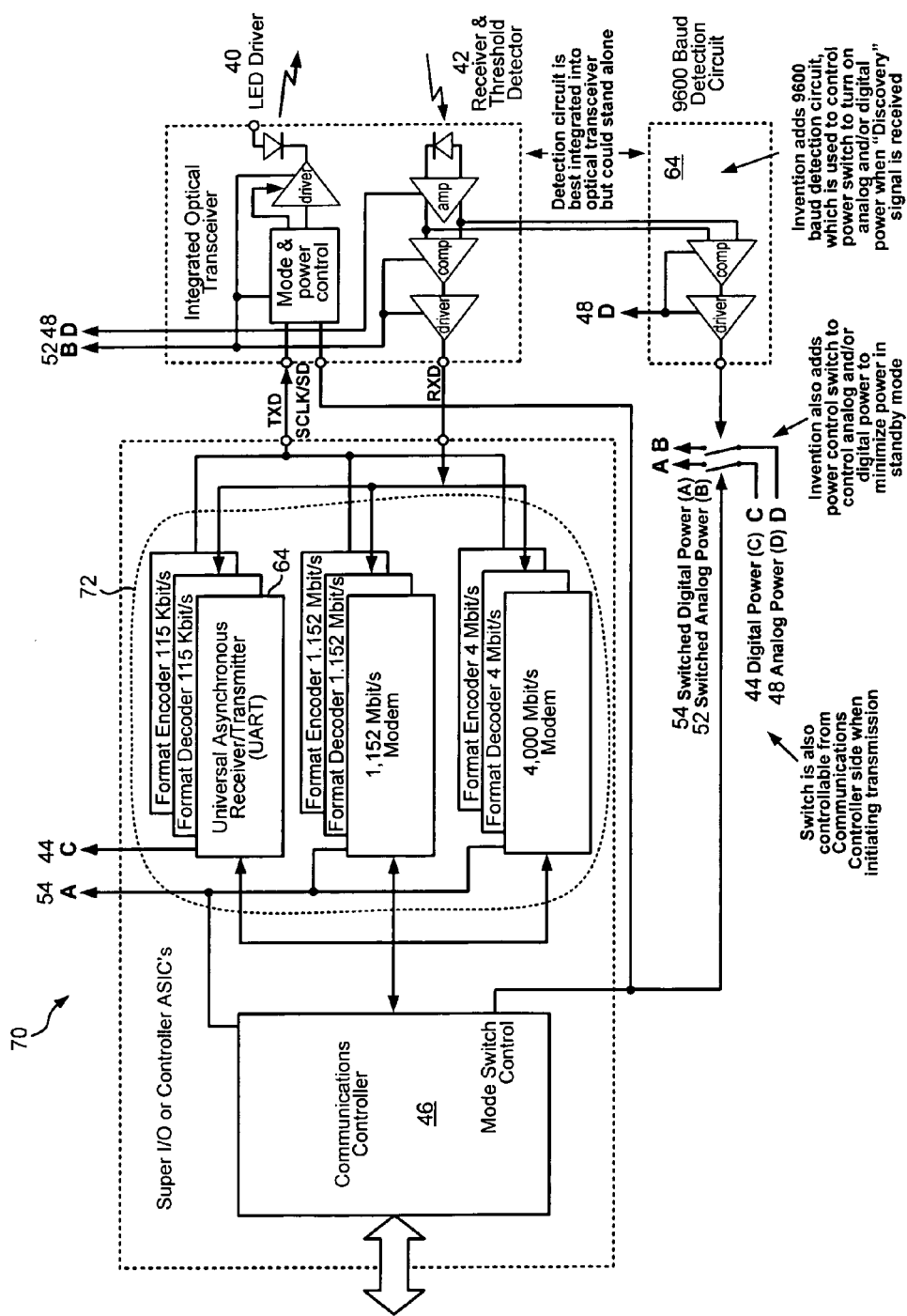
FIG. 6 is a schematic diagram of a preferred low power discovery signal receiver and integrated power actuator system of the present invention.

FIG. 6 is a schematic diagram of a preferred low power discovery signal receiver and integrated power actuator system of the present invention, such as the system described above in connection with FIG. 5. In this circuit, the UART operates in a low-power condition to provide surveillance for a discovery signal—in this case a 9600 baud Ir signal. It should be appreciated that while a conventional Ir transceiver system consumes in excess of 5 (five) milliamperes (mA) of current, the low-power standby circuitry consumes much less than 1 (one) mA of current. In fact, the standby power consumption is in the range of one-tenth of the conventional power consumption.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An IrDA transceiver module, comprising:
    an IrDA receiver that has a low-power state and a full-power state; and
    an IrDA discovery signal detection circuit that generates a power-up signal upon detection of a 9600 baud IrDA discovery signal, the power-up signal causing the operation of the IrDA receiver to switch from the low-power state to the full-power state.

2. The IrDA transceiver module of claim 1, wherein the IrDA transceiver module is in a low-power listening mode when the IrDA receiver is in the low-power state.

3. The IrDA transceiver module of claim 1, wherein the IrDA transceiver module includes only one infrared receiver.

4. The IrDA transceiver module of claim 3, further wherein the IrDA receiver comprises a comparator, the comparator having a low-power state and a high-power state, the IrDA discovery signal detection circuit causing the comparator to switch from the comparator's low-power state to the comparator's high-power state upon detection of the 9600 baud IrDA discovery signal.

5. The IrDA transceiver module of claim 4, wherein the comparator has a power lead, the comparator receiving more power through the power lead in the receiver's full-power state than in the receiver's low-power state.

6. The IrDA transceiver module of claim 1, wherein the switching from the receiver's low-power state to the receiver's full-power state enables full IrDA signal transmission and receipt by the IrDA transceiver module.

7. The IrDA transceiver module of claim 1, wherein the 9600 baud discovery signal is transmitted from an appliance, and wherein the switching from the receiver's low-power state to the receiver's full-power state enables the IrDA transceiver module to reply to the appliance by transmitting an infrared signal to the appliance.

8. An IrDA transceiver comprising an infrared receiver, an infrared transmitter and an IrDA discovery signal detection circuit, wherein detection of a 9600 baud signal by the IrDA discovery signal detection circuit causes the infrared receiver to switch from a receiver low-power standby state to a receiver full-power state, said detection of the 9600 baud signal causing the IrDA transceiver to be enabled for full infrared signal receipt.

9. An IrDA transceiver comprising:
    infrared transmitter circuitry;
    infrared receiver circuitry; and
    means for enabling full infrared signal receipt upon detection of a 9600 baud IrDA discovery signal.

10. The IrDA transceiver of claim 9, wherein the means detects the 9600 baud IrDA discovery signal and thereupon increases an amount of power supplied to the infrared receiver circuitry.

11. A method comprising:
    operating an IrDA receiver in a low-power state, wherein the IrDA receiver is part of an IrDA transceiver module;
    detecting an IrDA discovery signal using the IrDA receiver in the low-power state and in response to said detecting generating a signal; and
    in response to said signal causing the IrDA receiver to switch from the low-power state to a high-power state.

12. The method of claim 11, wherein the IrDA transceiver module consumes an amount of power when the IrDA receiver is in the high-power state, and wherein the IrDA transceiver module consumes approximately one-tenth of said amount of power when the IrDA receiver is in the low-power state.

13. The method of claim 11, wherein the IrDA receiver comprises:
    a photodiode;
    an amplifier that is powered in the low-power state; and
    comparator circuitry, the comparator circuitry being supplied with more power in the high-power state than in the low-power state.

14. The method of claim 13, wherein the IrDA transceiver module is not able to transmit an infrared IrDA signal when the IrDA receiver is in the low-power state, and wherein the signal enables the transceiver to transmit an infrared IrDA signal.

* * * * *

UNITED STATES PATENT AND TRADEMARK OFFICE
CERTIFICATE OF CORRECTION

| | | |
|---|---|---|
| PATENT NO. | : 7,221,285 B1 | Page 1 of 1 |
| APPLICATION NO. | : 09/135154 | |
| DATED | : August 17, 1998 | |
| INVENTOR(S) | : T. Allan Hamilton | |

It is certified that error appears in the above-identified patent and that said Letters Patent is hereby corrected as shown below:

Column 5, line 22, the following word should be deleted after the words "claim 3," and before the words "wherein the IrDA":

"further".

Thus, lines 22-28 of column 5 should read:

4. The IrDA transceiver module of claim 3,
wherein the IrDA receiver comprises a comparator, the comparator having a low-power state and a high-power state, the IrDA discovery signal detection circuit causing the comparator to switch from the comparator's low-power state to the comparator's high-power state upon detection of the 9600 baud IrDA discovery signal.

Signed and Sealed this

Third Day of July, 2007

JON W. DUDAS
*Director of the United States Patent and Trademark Office*

UNITED STATES PATENT AND TRADEMARK OFFICE
CERTIFICATE OF CORRECTION

PATENT NO.         : 7,221,285 B1
APPLICATION NO. : 09/135154
DATED                 : May 22, 2007
INVENTOR(S)       : T. Allan Hamilton It is certified that error appears in the above-identified patent and that said Letters Patent is hereby corrected as shown below:

Column 5, line 22, the following word should be deleted after the words "claim 3," and before the words "wherein the IrDA":

"further".

Thus, lines 22-28 of column 5 should read:

4. The IrDA transceiver module of claim 3, wherein the IrDA receiver comprises a comparator, the comparator having a low-power state and a high-power state, the IrDA discovery signal detection circuit causing the comparator to switch from the comparator's low-power state to the comparator's high-power state upon detection of the 9600 baud IrDA discovery signal.

This certificate supersedes Certificate of Correction issued July 3, 2007.

Signed and Sealed this

Thirty-first Day of July, 2007

JON W. DUDAS
*Director of the United States Patent and Trademark Office*